United States Patent [19]

Bauer

[11] Patent Number: 5,877,759
[45] Date of Patent: Mar. 2, 1999

[54] INTERFACE FOR USER/AGENT INTERACTION

[75] Inventor: German W. Bauer, Garches, France

[73] Assignee: Netscape Communications Corporation, Mountain View, Calif.

[21] Appl. No.: 825,210

[22] Filed: Mar. 26, 1997

[51] Int. Cl.⁶ ............................. G06F 3/14; G06F 15/163; G06F 17/30
[52] U.S. Cl. ............................ 345/339; 345/329; 345/338; 345/968; 345/963; 395/200.32; 395/200.33; 395/683; 707/10
[58] Field of Search ...................................... 345/329, 332, 345/963, 968, 331, 971, 336, 338, 337, 333, 335, 339; 395/200.32, 200.33, 200.35, 200.49, 680, 683; 707/10

[56] References Cited

U.S. PATENT DOCUMENTS

| | | | |
|---|---|---|---|
| 5,634,127 | 5/1997 | Cloud et al. | 395/680 |
| 5,664,126 | 9/1997 | Hirakawa et al. | 345/329 |
| 5,701,451 | 12/1997 | Rogers et al. | 395/200.32 X |
| 5,727,174 | 3/1998 | Aparicio, IV et al. | 345/336 X |
| 5,740,362 | 4/1998 | Buickel et al. | 707/10 |
| 5,754,857 | 5/1998 | Gadol | 395/680 |

OTHER PUBLICATIONS

"Implementation Diagram", 1996, Netscape Communications Corporation, published at *Server Central*.

*Primary Examiner*—Raymond J. Bayerl
*Attorney, Agent, or Firm*—Michael A. Glenn

[57] ABSTRACT

A user interface, for example for Internet and intranet agents, embodies the technical potential of automation and delegation into a cohesive structure. The invention also provides intelligent assistance to the client user interface and provides an interface that is centered on autonomous processing of whole tasks rather than sequences of commands, as well as the autonomous detection of contexts which require the launch of a process, especially where such context is time-based.

12 Claims, 6 Drawing Sheets

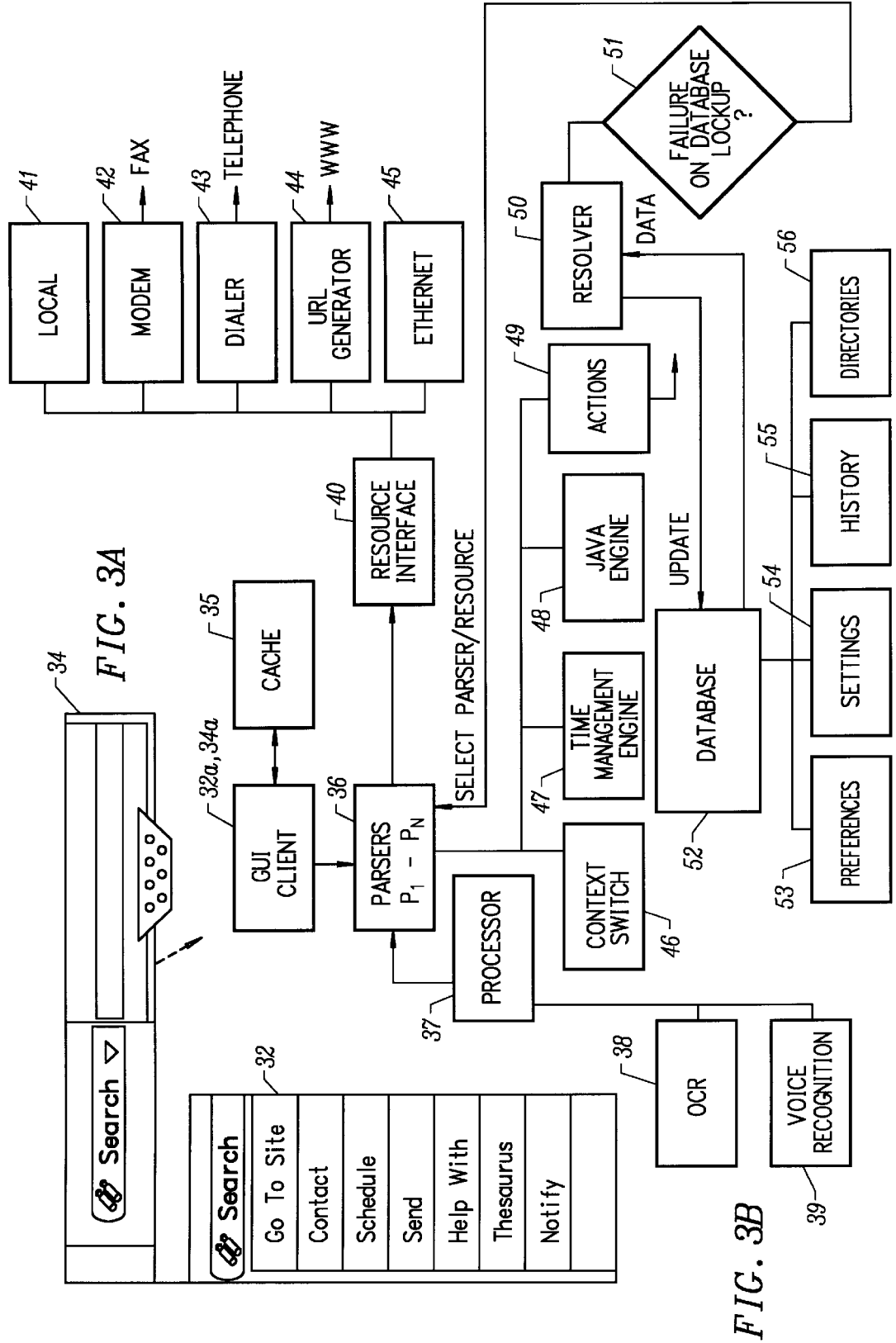

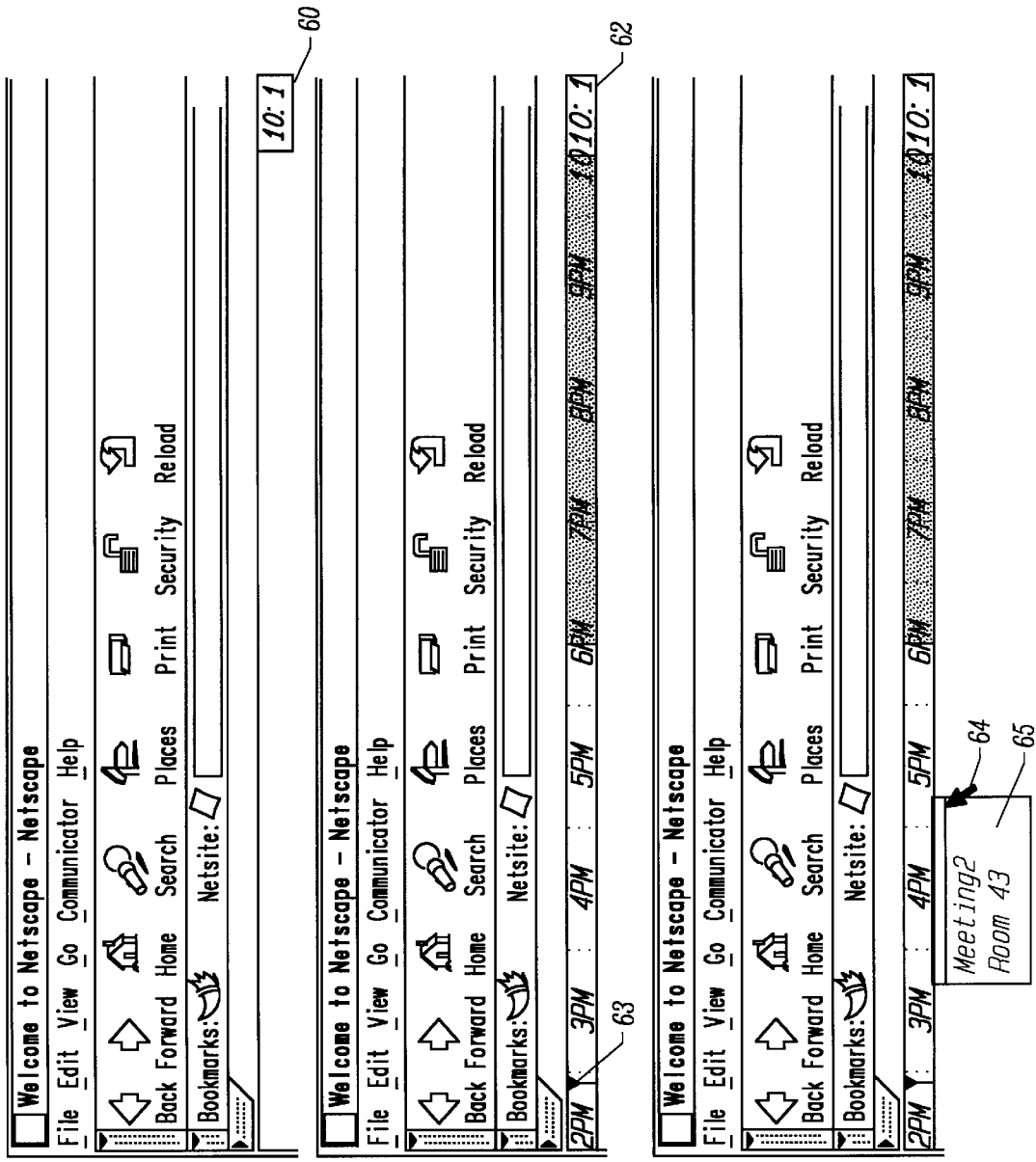

FIG. 9

INTERFACE FOR USER/AGENT INTERACTION

BACKGROUND OF THE INVENTION

1. Technical Field

The invention relates to accessing and using information. More particularly, the invention relates to an interface for user/agent interaction.

2. Description of the Prior Art

Information management is no longer the enterprise administrator's exclusive domain. With the Internet and the increased use of intranets, each individual is becoming an information manager. In fact, individuals are more and more finding themselves awash in information. The point in an enterprise at which a user accesses and manipulates such information resides in a client process and is typically referred to as the graphical user interface. Traditional graphical user interfaces usually return the result of an action immediately in a direct manipulation situation, and tasks are generally handled in one-at-a-time fashion, where the user is directly involved in most of the steps.

FIG. 1 is a block schematic diagram of an information system that comprises a client 10 that includes an information access/management tool, such as a browser 12. A user interacts with the browser to access resources at, or in communications with, a server 14. The server typically provides client access to a wide area network, such as the Internet or an intranet.

One approach to managing information across the Internet/intranets is the use of an intelligent agent. An intelligent agent 16 provides a tool for organizing user requests for resources, for example by filtering email messages sent to the user or by remembering various user preferences.

One presently available tool that provides improved management of enterprise wide information resources is SuiteSpot, which is manufactured by Netscape Communications Corporation of Mountain View, Calif. SuiteSpot provides a suite of Internet/intranet servers that comprise various modules, such as LiveWire Pro, which is a site management and JavaScript development tool, as well as any combination of an Enterprise Server, Web server, Proxy Server, Mail Server, News Server and Catalog Server.

All of the SuiteSpot servers share the same browser-based administration interface and JavaScript support. SuiteSpot uses Internet protocols directly for messaging, for example, rather than requiring gateways that translate Internet mail into their proprietary protocols.

LiveWire Pro includes a visual Site Manager for administering a Web site, an Application Manager, and a Navigator Gold browser which adds HTML editing features to the Netscape Navigator browser. LiveWire Pro automatically tracks and fixes interdependent links and checks all the external links on a site.

The Site Manager allows a user to view a graphical hierarchical list of all the pages, graphics, and links on a Web site. The Site Manager also supports drag and drop HTML pages and graphics around the site.

The Enterprise Server also supports full-text searching and indexing and has an AutoCatalog feature that lets administrators automatically index and classify all the data on their sites. The Enterprise Server includes configurable logging capabilities that allow a user to specify exactly what information the user wants recorded about each connection and easily customize the format of the log files. From the Enterprise Server logs it is possible to generate reports automatically.

The Catalog Server allows users to manage all of their on-line resources in a single index similar to the Yahoo Index on the Web. The Catalog Server allows users to index and classify information across numerous servers.

The open server software components in the Netscape SuiteSpot product (plus LiveWire Pro) include:

Netscape Enterprise Server for publishing live on-line content, with Java support;

Netscape Messaging Server, a high-performance messaging solution with interoperability with both native Internet and proprietary LAN-based mail systems;

Netscape Collabra Server, an open and secure discussion server;

Netscape Calendar Server, for calendaring and scheduling of people, groups and resources;

Netscape Media Server, an audio broadcasting and publishing extension to the Enterprise server with support for Real Time Streaming Protocol (RTSP);

Netscape Catalog Directory, an automated search and discovery server for creating and managing an on-line catalog of documents residing on corporate intranets and the Internet;

Netscape Directory Server, for managing white pages information such as names, email addresses, phone numbers, and certificates—all built on the Internet Lightweight Directory Access Protocol (LDAP) standard developed by the University of Michigan in conjunction with the Internet Engineering Task Force, and used to query recipient capabilities dynamically;

Netscape Certificate Server, that enables organizations to issue, sign, and manage public-key certificates using Secure Sockets Layer encryption; and Netscape Proxy Server, for caching frequently accessed documents.

While SuiteSpot provides a complement of Internet/intranet resource management/access tools, all user accessible via a common graphic user interface, it would be advantageous to provide a user interface, for example for Internet and intranet agents, that embodies the technical potential of automation and delegation into a cohesive interface, e.g. an interface that is centered on autonomous processing of whole tasks rather than sequences of commands, as well as the autonomous detection of contexts which require the launch of a process, especially where such context is time-based.

SUMMARY OF THE INVENTION

The invention provides a user interface, for example for Internet and intranet agents, that embodies the technical potential of automation and delegation into a cohesive interface. The invention also introduces the notion of intelligent assistance to the client user interface. This does not necessarily imply that the invention requires the existence of artificial intelligence mechanisms. Rather, the invention provides an interface that is centered on autonomous processing of whole tasks rather than sequences of commands, as well as the autonomous detection of contexts which require the launch of a process, especially where such context is time-based. This type of interface is often better suited for typical tasks in a wide-area intranet or the Internet than a traditional graphic user interface.

BRIEF DESCRIPTION OF THE DRAWINGS

FIG. 3a is a schematic representation of a funnel and pop-up menu according to the invention;

FIG. 3b is a more detailed block schematic diagram of the system of FIG. 2, showing the relation of the system to the funnel and pop-up menu of FIG. 3a, according to the invention;

FIG. 4 is a schematic representation of a browser during a start situation according to the invention;

FIG. 5 is a schematic representation of a browser in which the view is expanded to show the time line according to the invention;

FIG. 6 is a schematic representation of a browser in which an inquiry is made about single events according to the invention;

FIG. 9 provides a schematic representation of a browser in which the schedules or various individuals are compared side-by-side according to the invention.

DETAILED DESCRIPTION OF THE INVENTION

Figure 1:
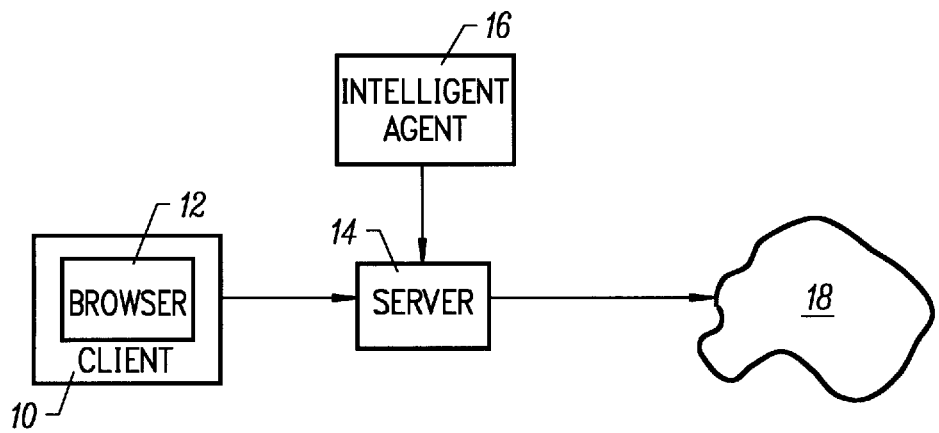
FIG. 1 is a block schematic diagram of an information system that comprises a client that includes an information access/management tool, such as a browser, according to the prior art.
Figure 2:
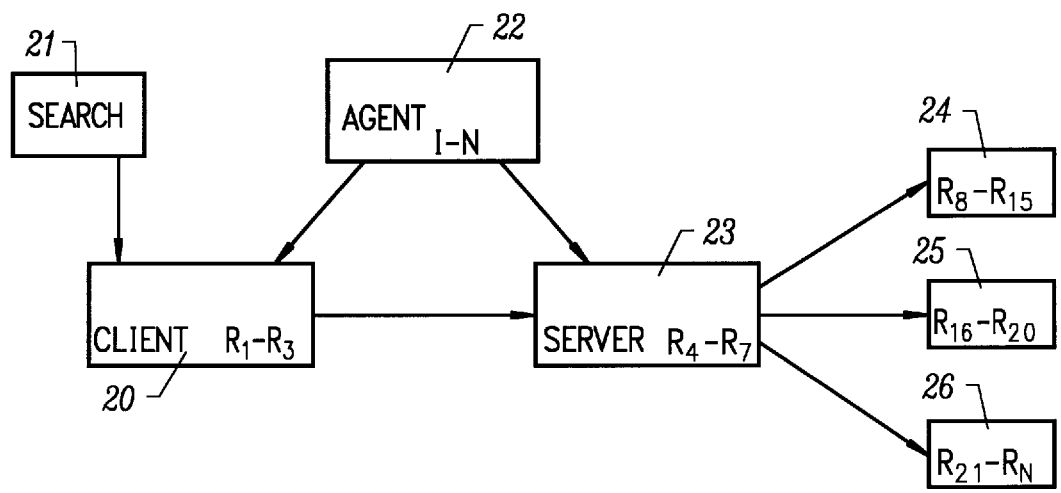
FIG. 2 is a block schematic diagram of a system that includes an interface for user/agent interaction in accordance with the invention.

FIG. 2 is a block schematic diagram of a system that includes an interface for user/agent interaction in accordance with the invention. For purposes of this document, the term "agents" shall mean small program entities that autonomously perform tasks directly or indirectly delegated to them by a user.

In the herein disclosed system, a user residing at a client 20 has locally available resources R1–R3. When the user delegates a task by interacting with the client graphic user interface, for example by initiating a search request 21, any number of agents 22, e.g. agents 1–n, residing at any appropriate location within the system, may be created to perform the task. The task may only involve resources at the client, e.g. resources R1–R3. Alternatively, the task may require any of the various resources that are located throughout the system, for example server 23 resources (e.g. resources R4–R7) and/or network resources 24–26 (any of resources R8–Rn). The system performs the search and adds system resources as needed.

Further, the system functionality is dynamically extended as additional resources become available. Thus, the invention provides transparent access to all client, server, and network resources. It is not necessary for the user to seek such resources consciously because an object (e.g. a Java applet) makes such resources available, along with a certain level of functionality. For example, the object comprises an agent that collects resources, establishes connections, and returns results.

The herein described agent interface for Internet and intranet applications is different from known graphic user interfaces because, unlike graphical user interfaces for traditional locally residing applications, the agent user interface herein disclosed must take into account that agents for Internet and intranet tasks essentially work in an asynchronous fashion.

As discussed above, traditional graphical user interfaces usually return the result of an action immediately in a direct manipulation situation, and tasks are generally handled in one-at-a-time fashion, where the user is directly involved in most of the steps.

In contrast, the invention provides a user interface in which there can be more than one agent working at any time because users are delegating those tasks and do not need to be involved during the task's execution. Further, because it often takes time to get task results back from a wide area network, agents can be specified in such a way that they react to the occurrence of an event (usually referred to as a trigger), e.g. every Monday at 9:00 AM or always when a file in certain folder has been modified, which might be outside the time when the agent was created. Triggers may also occur when a certain selection of objects is made, and the agent may also react in a context-sensitive way.

In a preferred embodiment of the invention, agents maybe preprogrammed in such a way that they recognize patterns in how an interface is used, e.g. the agent assists the user by suggesting how to perform a certain task more efficiently. As a consequence, the herein disclosed interface to Internet or intranet agents is radically different from a traditional graphic user interface.

In particular, the novel interface disclosed herein must provide the following elements:

Setup an agent task (not always implicitly by the end user) and supply the agent with information about the task.

Check on progress of an agent task previously started.

Influence the course of action of an agent previously set up, or cancel the agent altogether.

Notification upon completion of the task, or when the agent needs feedback/additional information to successfully complete the task.

A way to access the results, once the task has been completed.

A security element that provides the user with notification if an agent can travel across domains and/or that blocks alien agents from entering or manipulating the user's system.

Additional features of the invention having somewhat less importance include elements that duplicate or store agents for later reuse, and that mail or forward the agents to other users.

The user interface agent may be thought of as permanently approachable. Today, the user has to find the appropriate tools for his/her task rather than letting the system do the work of navigating through the interface. It becomes the user's burden to memorize the correct sequence of commands when trying accomplish complete tasks. Furthermore, the current client interface does not provide for automation of repetitive tasks. In contrast, the agent system herein disclosed is omnipresent, and therefore provides for an active navigation, for example through an application's user interface. The agent system invokes all the necessary parts inside an application automatically to work towards a solution. Thus, the herein disclosed agent system can also be thought of as an alternative user interface to the standard interface of the application.

Agents should not be passive, relying on the user to complete the task properly. Rather, agents should be actively involved in the task. For example, known user help systems require the user to work through instructions, and then go back to the task. The utility of such help systems is significantly improved when the agent herein disclosed incorporates the user's actual data into a help sequence, rather than following the traditional approach of presenting the user with one or more generic samples. Further, users are currently responsible for determining if and when they consult the help system. The active agent herein disclosed makes suggestions on how to streamline user's tasks autonomously. The invention also provides certain types of agents that detect trends and notify users of potentially negative outcomes, e.g. an agent for an internal system that warns of low storage space.

The agent system herein disclosed is non-intrusive. An agent interface should not require the user to make a change in focus or context, and should not divert attention from the user's primary task, problem, or goal. The agent should not interfere with the application with which the user is working. The best agent interface is one that is invisible and that completely attaches to that upon which the user is working. In addition, shorthand gestures should be made available to the user, for example for the X top ten tasks that can be invoked from anywhere in the system.

The agent system herein disclosed is controllable. Even though the system might be able to perform an action by inferring the action based upon the task's context, the user should be able to interfere at any point and change or dismiss the action. Users should be able to dive and explore the difference between different levels of automation and look at and observe, so that skilled users may learn about customizing agents. Thus, the agent system herein empowers users, rather than just performing the tasks for them.

Note that the invention is very different from the concept of "Scripts" (see, for example the MacOS, manufactured by Apple Computer of Cupertino, Calif.) and "Wizards" (see, for example Windows 95, manufactured by Microsoft Corporation of Redmond, Wash.) which are no more than a predetermined series of steps that are executed complete well defined tasks. Such processes are usually not reversible once completed, nor does the user have any insight or participation into how the resolution was accomplished. Usability tests show that users are not looking for wizards but for polite, trustworthy, and communicative assistants that let the users take over or revisit the task whenever they wish.

The agent system herein is customizable and extensible. Users are not satisfied with rigid, predetermined solutions to problems. The system needs to be malleable enough to take in information of context and domain, and the tasks and intents of the user. The assistance system should localize and personalize itself. The system should also infer by using patterns of past usage, e.g. by metaphorically asking, "Good morning, do you want the usual . . . ?"

Users want to maintain a creative ownership of their work product, e.g. they do not want to have their business messages look exactly like those of the company across the street. The system should be able to respond to the learning progress that users have made, e.g. help that may be too verbose for the skilled user may be just the right amount of information for a first time user to get started. Furthermore, the system should observe and log often repeated task sequences to customize the list of top-X accessible routines.

The types of Agents the system herein disclosed provides include, for example:
"How do I . . . ?" assistance.
  Users can set up a request in the form of:
  "This is what I need, how do I get there . . . ?"
  The system can infer the user's intentions from the selection that is currently active (i.e. the selected object). The system can also infer the user's intentions by parsing a spoken or written (i.e. conversational language) request, and by looking for key words that it matches to the contents of an internal database. Additionally, the requests can be parsed by a synonyms database (e.g. as used today in any thesaurus application). Typical fill words and the order of the keywords usually do not matter. Rather, the agent system may obtain necessary information by logging the user's actions immediately before the request and/or by identifying the current network situation (i.e. on-line and/or off-line). The agent can then guess and propose possible courses of action that make sense, or it can ask some additional questions to constrain the problem and/or resolve ambiguities. Customized agents (e.g. the XYZ company HR agent) may have additional bodies of knowledge available for more specialized tasks. For an example of a design for such an agent see the discussion of the funnel embodiment of the invention, as discussed in greater detail below.

"Follow me . . . " starter/tutorial agent.
  First-time users often face the problem that a certain percentage of functionality of a system is not initially available and thus hidden. Arcade-style game programs and educational software use well-known kick start techniques during idle times (e.g. when the user is just staring at the screen and does not know where to start), thereby voluntarily exposing the user to part of the functionality. For example, the system may use a metaphor such as, "Hi, I am your system agent . . . These are the things I can show you today."

In one embodiment of the invention, an autorun tutorial is provided that starts by opening up a portion of the user interface, for example by showing a movie. Users may then gradually be engaged by modifying the data with which they are working, or they may suspend the autorun function and try the system for themselves.

"I am watching over you . . . " coaching agent.
  This embodiment of the invention helps the user to be more efficient in accomplishing certain tasks. Based on instrumentation code, and by recognizing and logging the user's action pattern, the system suggests shortcuts. This way the user can gradually progress from the easy-to-discover level of task execution to the efficient-to-use way of accomplishing tasks. For example, if the user always selects a command from the menu, the system may suggest that there is a keyboard shortcut or it may offer to set up one for the user. The system could also offer to add a button to the tool bar. More refined systems may take the context into account, and only make the shorthand visible in relevant contexts.

"Hire an expert . . . " assistance.
  Agents may possess special expertise and knowledge. Users are experts in their domains and, for example, may rely on assistance for the syntax of a search engine or the design of a business brochure. Such an agent is readily added to, or may reside on, an outside server, and can be accessed from the client. Thus, the invention provides an agent system that allows the creation of niche agents to help with specific tasks and domains, e.g. the Disney souvenir shopping agent, or the Sony CD selector agent.

"Do it again, Sam . . . " automation agent.
  Based on logging user's action patterns, the system could offer to automate and auto-schedule repetitive tasks. For example, the agent can advise the user that, "I notice that you often do XYZ at ABC time or when EFG occurs . . . Do you want me to take care of this automatically next time?" After the system starts recognizing the pattern, it can highlight the appropriate user interface controls in the correct sequence to show the user that it knows the scheme. By verifying and/or dismissing, the user would teach the agent.

Another embodiment of the invention provides a task based agent-user interface, referred to herein as a "funnel."

The funnel provides a user interface element that offers users intelligent choices of tasks that can be accomplished, based upon a given context and selection. The funnel is designed to allow for multiple ways to communicate a request. It recognizes a current selection and objects dragged onto it, as well as text typed into it. The funnel basically acts as a meta agent that knows about the capabilities of a system and consolidates the capabilities of various plug-in agents into one interface. Thus, it supports users by functioning in terms of complete tasks, rather than partial tools. The funnel also facilitates the discoverability by the user of the capabilities of a client system.

This feature of the invention facilitates the organization of the user interface based upon complete tasks. For purposes of the discussion herein, "complete tasks" consist of multiple sub-tasks that are separately executed in conventional systems by calling up the appropriate tools in the right sequence. A set of "most often used" tasks can be identified by domain, company, and/or user demographics and then extended by third parties or the user themselves (e.g. by recording or pattern recognition). Examples of such tasks include "schedule a meeting . . . ," "conduct a survey . . . ," or "make a reservation . . . "

FIG. 3a is a schematic representation of a funnel and pop-up menu according to the invention. FIG. 3a shows an embodiment of the invention that consists of two parts. The left side of the figure shows a pop-up menu 32 that contains tasks and activities, while the right side of the figure shows an expandable well 34, I.e. the funnel, into which a user can type and/or drop objects. The user may also speak into a microphone to access the funnel, for example if the user is vision impaired or has limited use of his limbs. It should be appreciated that the actual appearance of the funnel and pop-up menu are a matter of choice.

The funnel provides a decision overlay that operates upon user requests for actions or resources, where the order of execution of such requests may be simultaneous or sequential. An example of a simultaneously executed task is connecting to the World Wide Web; an example of a sequentially executed task is setting up a meeting with three other persons. Sequential tasks may be randomly executed, i.e. whenever resources are available for a particular portion of the task, or they may be hierarchically executed, e.g. based upon priority or resource driven.

Using the funnel, the client inherits all outside capability of an enterprise. Thus, the client is as powerful as the server and the network to which the server is connected. Accordingly, the funnel provides active access to all resources at all nodes of a network. This includes intranet, Internet, and SQL database resources. In this way, the funnel allows various intelligent agents to access disparate portions of the network to collect all information necessary to complete a task, e.g. setting up a meeting with several attendees, reserving facilities for the meeting, collecting reports to be distributed at the meeting, ordering food delivery to the meeting, and making travel arrangements for the attendees.

A funnel initiated search can be narrowed by user preferences, for example the user may limit the search to local resources. The search may be time delimited, for example the duration of the search may be limited based upon the appropriate amount of time to dedicate to the search. The search may be performed in the background and the user may be alerted when the search is completed, for example for delivery of an email confirmation or by a task log entry. Thus, the user can define any task-relevant parameter at the funnel, such as time, context, and location.

Recognizing objects and requests.

Rather than having to pick a particular tool, users can specify requests in their own terms. This can be accomplished by specifying a high-level term, e.g. "send." This can also be accomplished by choosing one or more targets and/or parameters, and then letting the funnel guess at and/or suggest the task. The funnel can recognize various instances of the same thing, e.g. a person can be represented by a name, a picture of a person, or simply by a mail address that happens to be selected in a text. All of these representations are treated as equal pointers to a person. Thus, the funnel does not impose one particular mode of working on the user.

Table 1 below provides an overview of recognized object categories.

TABLE 1

Recognized Object Categories

| Context/Input Mode -> Recognized as category: | Text selected somewhere or typed into the funnel | Iconic representation selected or dropped onto funnel | Direct manipulation |
|---|---|---|---|
| Person(s) | name of a person, an e-mail address, a roster of people (e.g. discussion/news group/mail list) | Picture ID of that person or business card (v-card) or VRML avatar | |
| Thing(s) | File/folder name | File/folder Icon or VRML object | |
| Place(s) | URLs, local machine name, local file path | Bookmark icon, VRML iocation | |
| Time frame | 1:00 PM, 8 September, tomorrow, next week, at lunch, over dinner | | Drag along the time track (start time/end time) |
| Generic Text | anything that cannot be recognized in the aforementioned categories | | |
| Activities | Users may also use a verbal description of the request directly, e.g. "send," "mail," "fax," "set up (lunch tomorrow with Michael)" | | |
| Third Party recognizers | Third parties can provides plug-in recognizers that can interpret additional or more specific object types, e.g. the name of a city or country couid be recognized by the XYZ travel organizer which provides travel information for a specified region | | |

Once an object or a collection of objects is recognized, the funnel can suggest meaningful activities, constrained only by the capabilities of the system and the recognizers. The more details that are specified by the user through the funnel, the more the choice of activities is narrowe.

Table 2 below provides an overview of recognized objects and activities suggested by the funnel.

TABLE 2

Activities Suggested by the Funnel

| Recognized Object(s) | Activities suggested by funnel | | | | | |
|---|---|---|---|---|---|---|
| Person(s) | search person | send message to this person | contact person directly/video conference | schedule meeting with these people | | |
| Person(s) and Thing(s)/files | search for when person(s) interacted with thing | send this thing to these person(s) | talk to person(s) now about this thing | schedule meeting with these people about this thing | | |
| Person(s) and time frame | | | | schedule meeting with these people for this time | | |
| Person(s) and place(s) | see whether these people are at this place | | | schedule meeting with these people at this place | | |
| Person(s) and generic text | | send memo to person | talk to person(s) about this clipping/topic | | | |
| Thing(s) | search for these/related things | | | | bundle these things into a container | Help me with . . . |
| Thing(s) and place(s) | | upload this to these place(s) | | | | |
| Thing(s) and time frame | | | | | | Version control? |
| Thing(s) and generic text | | | | | label this things/these things with this text | |
| Place(s) | | upload something to this place | | | go to place | |
| Place(s) and time frame | | | | | | |
| Place(s) and generic text | | save a note to this place | | | | |
| Time frame | | | | schedule a meeting | schedule a reminder | |

TABLE 2-continued

Activities Suggested by the Funnel

| Recognized Object(s) | Activities suggested by funnel | | | | |
|---|---|---|---|---|---|
| Time frame and generic text | | | make a note with this content to pop up at this time | | |
| Generic text | search for the occurrence of these terms on a Web site, consult advice on this. . . (e.g. launch appropriate usenet FAQ), query company database | send a memo to someone or some place | thesaurus look up | spell check this text | help me with this topic |

The preferred embodiment of the invention suggests a pop-up menu to present meaningful activities, and the most probable, i.e. default, choice is displayed as the pop-up's label. This choice can be executed by clicking on the pop-up menu. The funnel interface then calls up the needed sub-agents and applications, and supplies them with the data recognized from the user's request, as well those recorded from earlier usage patterns and inferred from the system state. The sub-agents then go ahead and request any missing information from users if needed to make the request non-ambiguous.

EXAMPLE

The user has dragged a selection frame around four person icons and shift-selected a time from 1 P.M. to 3 P.M. on a time track time line. The funnel recognizes these choices, and shows icons for people and one clock icon inside its well. The funnel suggests by default to schedule a meeting. The user clicks on the pop-up that is labelled "schedule meeting . . . ," at which point the funnel calls the meeting agent. The meeting agent in return notices that the user has not yet specified a date and offers "one-time" or "recurring" scheduling.

Once the date is specified (either by completing the agent dialog or by clicking on the system calendar, which fills in the dialog automatically), the agent then asks for location preferences. The meeting agent (which could reside on a server) then notifies each invitee's personal agent to inquire about their schedules and preferences, and negotiates a possible common time frame for a meeting.

The meeting agent is also aware of diverse priorities of the participants. The meeting agent then requests the auto-mail agent to send email out to the participants, and to update their time lines. If a location was not specified, a facilities agent is called up that knows about common meeting places. The facilities agent then suggests a place and/or if some participants should use video conferencing to save costs. If travel is necessary, the travel agent is called up from the facilities agent to make the necessary reservations.

FIG. 3b is a more detailed block schematic diagram of the system of FIG. 2, showing the relation of the system to the funnel and pop-up menu of FIG. 3a, according to the invention. The system shown on FIG. 3b is linked by a dashed line to the funnel shown on FIG. 3a. This convention is used to show that the funnel is a user point of contact with all of the resources of an enterprise and, thus, provides such resources to the user at a single location.

The graphic user interface GUI 32a/34a is generated on a display using known techniques. Information entered into the GUI may be buffered in a cache 35. The user entered information is parsed by parsers P1–Pn 36. The parsers may operate in conjunction with one or more preprocessors 37, for example to convert information to a common format, e.g. by means of an OCR 38 with regard to printed text or a voice recognitions module 39. The parsers may also include modules for parsing remote components, such as a URL parser for World Wide Web documents; a name parser for identifying addresses; and/or a word parser for identifying commands to applications, such as a scheduler, e.g. the word "lunch," a person's name, or a context, and such other words as locations, e.g. city names.

The parser recognizes user input to the funnel and operates in connection with a resource interface 40 to access any available resource to complete a task. Such resources may be local resources 41, such as local applications, a local CD-ROM, and/or local hardware/software; a modem 42, for example to establish an on-line connection or to send a facsimile; a dialer 43 for establishing a telephone connection for voice communications; a URL generator 44 for establishing a World Wide Web connection; and/or an Ethernet connection 45 for establishing local area network communications.

All of these resources are registered with the parser and therefore available to the user via the funnel. In registering with the funnel, the resource makes itself known to the system by providing information about itself to the system, such as name/type of resource, what data types the resource can process, e.g. text, URLs, and/or what actions can be performed by the resource. The actions available at the resource appear as functionality at the funnel as part of the popup menu. Thus, the funnel adds functionality in the form of actions that are accessible to the user at the pop-up menu, to the extent that such functionality exists within the system and is available to the funnel.

The system include a context switch 46 that can translate user selections based upon their context. For example, a "Schedule" request establishes a schedule context. A time management engine 47 (discussed in greater detail below) establishes time parameters, alerts the user to scheduled events, and time stamps activities and completed tasks. A Java engine 48 provides for the parsing and/or generation of Java applets to enhance the functionality of a user request by including platform independent coded routines with a request, or by receiving and executing such routines as a result of a request. Finally, the system may generate actions 49, such as the generation of an agent to complete a task.

The parser also includes a resolver 50 for satisfying ambiguous or arcane requests. The resolver may access a database 52 to determine whether or not a request is resolvable. The resolver may also update the database as the user defines the request. For example, the user may enter a few letters of a command. If the command is recognized it is executed; if the command is not recognized, there is a failure on the database lookup 51 and the resolver returns a message to the user, at which point the user may type a few more letters to define further the nature of the request. The database itself may include modules that store user preferences 53, settings 54, history 55, and directories 56, such as an address book or a list of World Wide Web bookmarks.

Scheduling Interface.

Another embodiment of the invention provides an interface for the scheduling application.

FIG. 4 is a schematic representation of a browser during a start situation according to the invention. When the user has logged into the system, he is greeted with a clock 60 at the edge of the display. This clock represents the most minimized state of the scheduling application. It displays the local time for that user.

FIG. 5 is a schematic representation of a browser in which the view is expanded to show the time line according to the invention. By clicking on the clock 60 the view can be expanded to reveal a time line 62 stretching across the screen. The triangle 63 at the left side represents current time, the time line moves underneath. Highlighted bars at the bottom are visible that convey information about upcoming events.

FIG. 6 is a schematic representation of a browser in which an inquiry is made about single events according to the invention. By moving the cursor over any particular event line, the event information 65 for that event pops to the foreground. This also happens when an event is due, e.g. 15 minutes before a meeting starts. This is to remind that user that the event is to take place soon.

Figure 7:
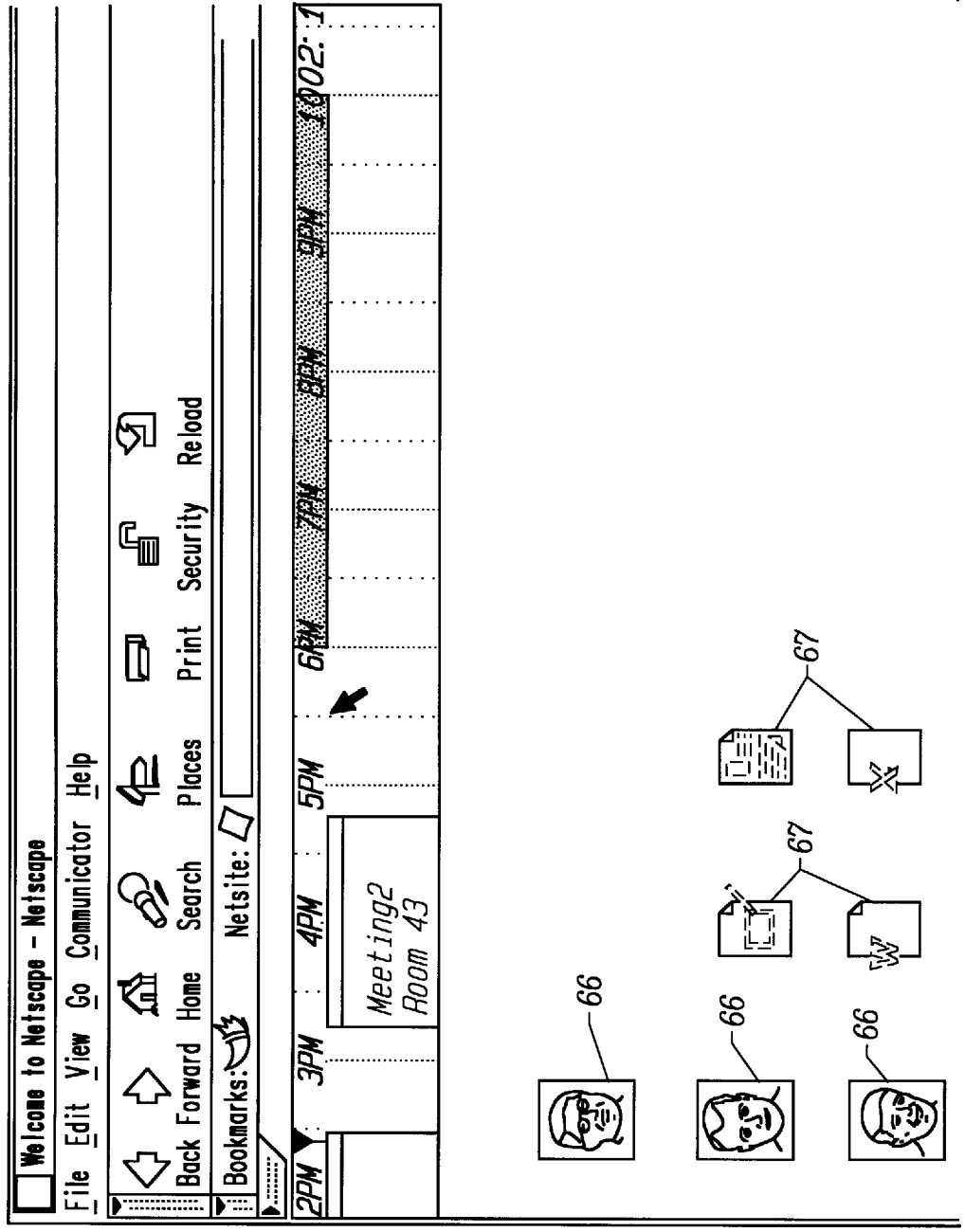
FIG. 7 is a schematic representation of a browser in which a day's schedule is displayed according to the invention.

FIG. 7 is a schematic representation of a browser in which a day's schedule is displayed according to the invention. If the user inquires about all the events for the day, the complete schedule for the day can be opened, revealing detail information for all the meetings in that time frame. In the example provided on FIG. 7, a photograph 66 of each of the meeting attendees is displayed, as well as iconic indications 67 of resources available for or required at/for the meeting.

Figure 8A:
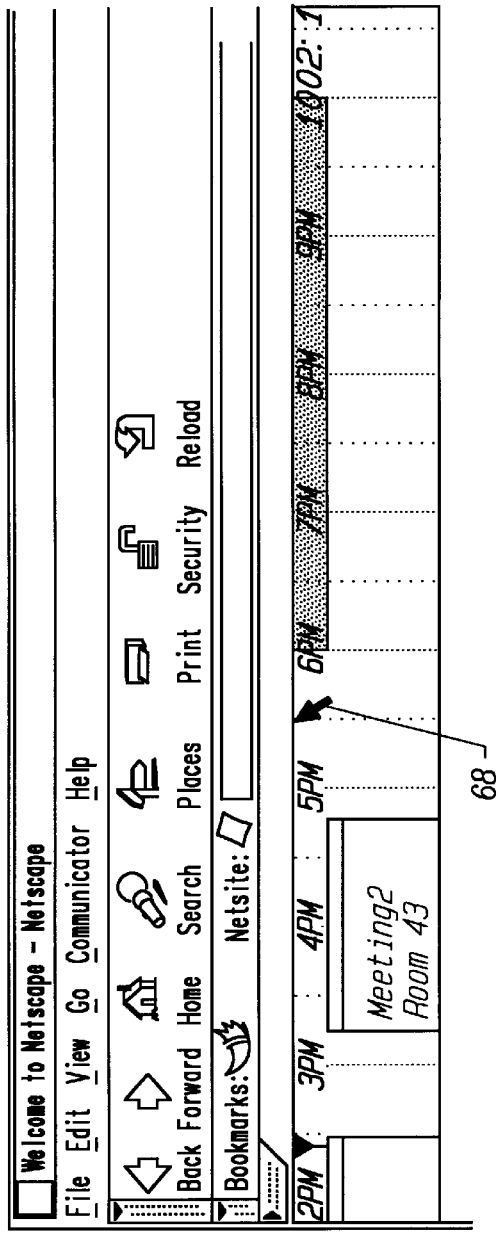
FIGS. 8a and 8b provide a schematic representation of a browser in which a time interval is selected, creating a new event according to the invention.
Figure 8B:
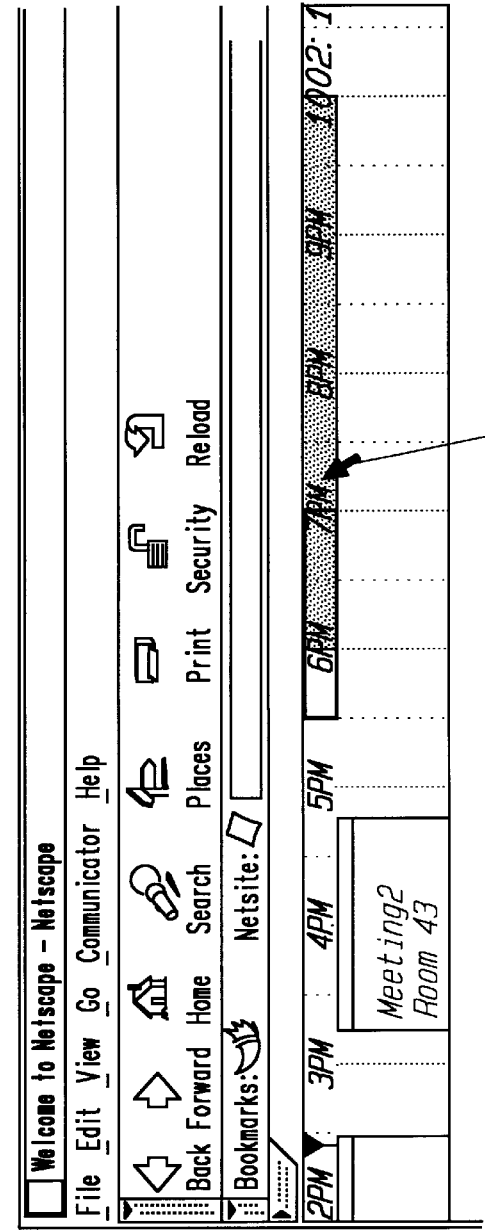

FIGS. 8*a* and 8*b* provide a schematic representation of a browser in which a time interval is selected, creating a new event according to the invention. The time line is used to create new events by selecting a "from" time 68 (FIG. 8*a*) and a "to" time 69 (FIG. 8*b*) by using the usual selection marquee. A click on the time line selects a particular time point, e.g. to create a deadline.

Figure 9:
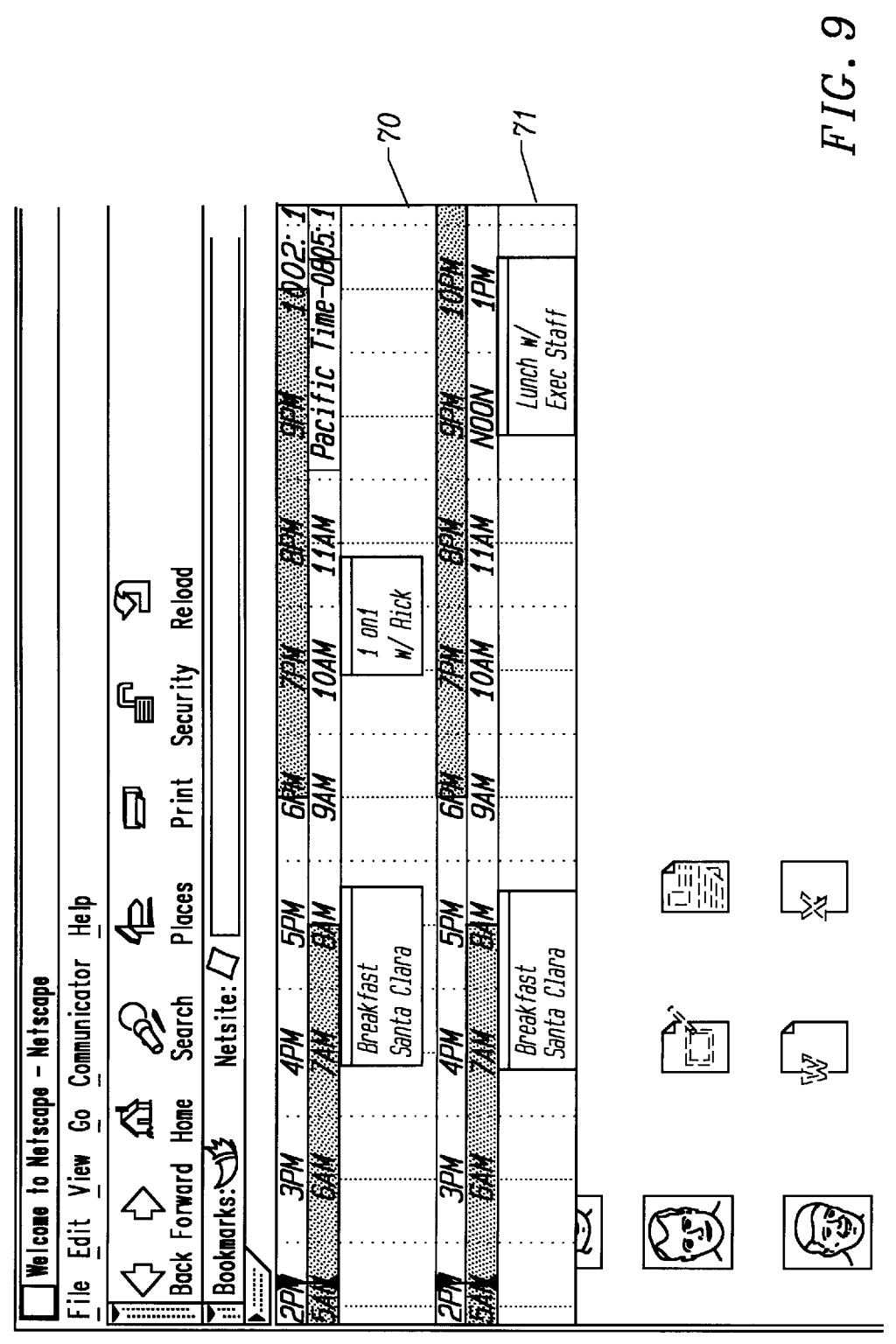

FIG. 9 provides a schematic representation of a browser in which the schedules of various individuals are compared side-by-side according to the invention. To identify scheduling conflicts, e.g. when setting up meetings, it is useful to view the user's own schedule 70 next to another person's schedule 71. This second time line also shows the offset, if the person happens to be in a different time zone. This happens often in globally operating companies, and simplifies scheduling for teleconferences. In current applications this information is often difficult to obtain.

Other days following the current one can be displayed by clicking on the headers with the day names. Month and year displays are also provided by the invention, where weeks and months are shown respectively instead of days. The time line may be used universally to display information on age of documents, and when and by whom they were last modified, as well as making this a view on the user's main display, aligning document icons, indicating when they were created. The time line shows the day, month, or year view, depending on the selection.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. An interface for user/agent interaction, comprising:
   a user interface element that offers a user intelligent choices of tasks that can be accomplished, based upon a given context and selection, wherein said tasks comprise multiple sub-tasks that are separately executed in conventional systems by calling up appropriate tools in a correct sequence;

said interface element comprising:
   a funnel into which a user can type and/or drop objects, wherein said funnel provides a decision overlay that operates upon user requests for actions or resources, where the order of execution of such requests may be simultaneous or sequential, and where sequential tasks may be randomly executed or they may be hierarchically executed, and wherein said user inherits all outside capability of an enterprise; and
   a pop-up menu that contains tasks and activities;
   wherein said interface element allows multiple ways to communicate a user request and wherein said interface element recognizes a current selection and objects dragged onto it, as well as text typed into it; and a meta agent that knows about the capabilities of a system and consolidates said capabilities of various plug-in agents into said interface element, wherein a funnel initiated search can be narrowed by user preferences, wherein said search may be time delimited; wherein said search may be performed in the background and a user may be alerted when said search is completed, and wherein said user can define any task-relevant parameter at said funnel, including any of time, context, and location.

2. The interface of claim 1, wherein a user may speak into a microphone to access said funnel.

3. The interface of claim 1, further comprising:

a parser, wherein a user can specify requests in high-level terms by choosing one or more targets or parameters and, responsive thereto, said parser suggesting a requested task.

4. The interface of claim 1, wherein said funnel can recognize various instances of the same thing, wherein all of these instances are treated as equal pointers to said thing.

5. The interface of claim 1, wherein said funnel can suggest meaningful activities, constrained only by the capabilities of said system and any recognizers, once an object or a collection of objects is recognized, wherein the more details that are specified by said user through said funnel, the more the choice of activities is narrowed.

6. The interface of claim 1, further comprising:

a pop-up menu to present meaningful activities and for displaying a most probable choice as a pop-up label.

7. A user point of contact with all of the resources of an enterprise for providing said resources to said user at a single location, comprising:

a graphic user interface generated on a display, said graphic user interface comprising:

a funnel, wherein actions available at resource appear as functionality at said funnel as part of a pop-up menu, wherein said funnel adds functionality in the form of actions that are accessible to said user at said pop-up menu, to the extent that such functionality exists within a system and is available to said funnel, wherein said funnel provides a decision overlay that operates upon user requests for actions or resources, where the order of execution of such requests may be simultaneous or sequential, and where sequential tasks may be randomly executed or they may be hierarchically executed, and wherein said user inherits all outside capability of an enterprise;

at least one parser for parsing user entered information to convert said information to a common format and for parsing remote components;

a resource interface for accessing any available resource to complete a user requested task, wherein said tasks comprise multiple sub-tasks that are separately executed in conventional systems by calling up appropriate tools in a correct sequence, wherein a resource is registered with said parser when said resource makes itself known to said parser by providing information about itself to said parser, said information consisting of any of name or type of resource, what data types said resource can process, and what actions said resource can perform.

8. The user point of contact of claim 7, further comprising:

a context switch for translating user selections based upon their context.

9. The user point of contact of claim 7, further comprising:

a time management engine that establishes time parameters, alerts said user to scheduled events, and time stamps activities and completed tasks.

10. The user point of contact of claim 7, further comprising:

a Java engine for parsing and generating Java applets to enhance the functionality of a user request by including platform independent coded routines with a request, and by receiving and executing such routines as a result of a request.

11. The user point of contact of claim 7, further comprising:

a resolver for satisfying ambiguous or arcane requests; and a database for determining whether or not a request is resolvable.

12. The user point of contact of claim 11, said database comprising:

modules that store user preferences, settings, history, and directories.

* * * * *